(12) United States Patent
Khalaf et al.

(10) Patent No.: US 9,973,571 B2
(45) Date of Patent: *May 15, 2018

(54) MIGRATING LEGACY APPLICATIONS TO A MULTI-TENANT COMPUTING ENVIRONMENT

(71) Applicant: International Business Machines Corporation, Armonk, NY (US)

(72) Inventors: Rania Y. Khalaf, Cambridge, MA (US); Vinod Muthusamy, Toronto (CA); David E. Shepard, Rye Brook, NY (US); Aleksander Slominski, Riverdale, NY (US)

(73) Assignee: International Business Machines Corporation, Armonk, NY (US)

( * ) Notice: Subject to any disclaimer, the term of this patent is extended or adjusted under 35 U.S.C. 154(b) by 63 days.

This patent is subject to a terminal disclaimer.

(21) Appl. No.: 14/748,776

(22) Filed: Jun. 24, 2015

(65) Prior Publication Data
US 2016/0261716 A1 Sep. 8, 2016

Related U.S. Application Data

(63) Continuation of application No. 14/635,501, filed on Mar. 2, 2015.

(51) Int. Cl.
*G06F 15/173* (2006.01)
*H04L 29/08* (2006.01)
(Continued)

(52) U.S. Cl.
CPC .......... *H04L 67/1002* (2013.01); *G06F 9/445* (2013.01); *G06F 9/45558* (2013.01);
(Continued)

(58) Field of Classification Search
None
See application file for complete search history.

(56) References Cited

U.S. PATENT DOCUMENTS 7,617,498 B1 * 11/2009 Lumsden .................. G06F 9/52
707/999.1
7,904,909 B1 * 3/2011 Reiner .................. G06F 9/5061
709/223

(Continued)

OTHER PUBLICATIONS

Shaya Potter, Jason Nieh, and Matt Selsky—Columbia University, pp. 117-130 of th eProceedings of the 21st Large Installation System Administration Conference (LISA '07} (Dalls, Nov. 11-16, 2007).*

(Continued)

*Primary Examiner* — Umar Cheema
*Assistant Examiner* — John Fan
(74) *Attorney, Agent, or Firm* — Fleit Gibbons Gutman Bongini Bianco PL; Thomas S. Grzesik

(57) ABSTRACT

Various embodiments migrate a legacy application to a multi-tenant computing environment. In one embodiment, at least one virtualized computing container is instantiated on a host system in a multi-tenant computing environment. An instance of the legacy application is executed within the virtualized computing container. The legacy application having been initially configured to run on premise and serve one tenant at a time. The virtualized computing container securely isolates the executing instance of the legacy application from other executing instances of the legacy application. At least one request received from a first client is sent to the instance of the legacy application executing within the virtualized computing container. The virtualized computing container is quiesced based on at least one quiescing criterion having been satisfied by the instance of the legacy application.

9 Claims, 10 Drawing Sheets

(51) Int. Cl.
*H04L 29/06* (2006.01)
*H04L 12/46* (2006.01)
*G06F 9/455* (2018.01)
*G06F 9/445* (2018.01)

(52) U.S. Cl.
CPC .......... *H04L 12/4641* (2013.01); *H04L 67/34* (2013.01); *H04L 67/42* (2013.01); *G06F 2009/4557* (2013.01); *G06F 2009/45562* (2013.01); *G06F 2009/45595* (2013.01)

(56) References Cited

U.S. PATENT DOCUMENTS

| | | | | |
|---|---|---|---|---|
| 2007/0171921 | A1* | 7/2007 | Wookey | G06F 3/1415 370/401 |
| 2012/0259909 | A1* | 10/2012 | Bachelor | G06N 3/02 709/201 |
| 2015/0229645 | A1* | 8/2015 | Keith | H04L 41/50 726/4 |
| 2015/0254088 | A1* | 9/2015 | Chou | G06F 9/45541 709/212 |
| 2016/0094510 | A1* | 3/2016 | Xiao | G06Q 10/107 709/206 |
| 2016/0098285 | A1* | 4/2016 | Davis | G06F 9/45545 718/1 |
| 2016/0132806 | A1* | 5/2016 | To | G06Q 30/018 705/7.23 |

OTHER PUBLICATIONS

List of IBM Patents or Applications Treated as Related.
Khalaf, R., et al., "Create an application with the IBM Workflow for Bluemix," Sep. 2014, pp. 1-10.
Turnbull, J., "The Docker Book: Containerization is the New Virtualization," Jul. 2014, pp. 1-4. Available at www.dockerbook.com.
Curbera, F., et al., "Bite: Workflow Composition for the Web," Service-Oriented Computing—ICSOC, Sep. 17-20, 2007, pp. 94-106.
Netflix Zuul, "An edge service that provides dynamic routing, monitoring, resiliency, security, and more," Downloaded online on Feb. 27, 2015, p. 1, Available at :https://github.com/Netflix/zuul.
McGee, J., "Bluemix Launches IBM Containers Beta Based on Docker", IBM, Dec. 4, 2014, pp. 1-7.
Google, "Google Container Engine," Downloaded on Feb. 27, 2015, pp. 1-2.
Prismatic, "8 Ways to Use Docker in the Real World," Downloaded Feb. 27, 2015, pp. 1-6.
AU Courant Technology., "Linux Containers: Parallels, LXC, OpenVZ, Docker and More," Jun. 13, 2014, pp. 1-20.
Gerlach, W., et al., "Skyport—Container-Based Execution Environment Management for Multi-Cloud Scientific Workflows," DataCloud 2014, Nov. 2014, pp. 1-8.
Sandstorm, "Sandtorm—An Open Source Platform for Personal Servers," Downloaded Feb. 27, 2015, pp. 1-4.
IBM Cloudant, Last visited on Feb. 27, 2015. Available at http://cloudant.com.

* cited by examiner

MIGRATING LEGACY APPLICATIONS TO A MULTI-TENANT COMPUTING ENVIRONMENT

CROSS REFERENCE TO RELATED APPLICATION

This application is a continuation of and claims priority from U.S. application Ser. No. 14/635,501 filed on Mar. 2, 2015, the disclosure of which is hereby incorporated by reference in their entirety.

BACKGROUND

The present disclosure generally relates to multi-tenant computing environments, and more particularly relates to migrating legacy applications to a multi-tenant computing environment.

Multi-tenant computing environments, such as cloud computing environments, enable a single instance of software to execute on a server while serving multiple tenants. Multi-tenant software/applications are designed to provide each tenant a dedicated share of the instance including its configuration, data, and the like. Legacy applications, on the other hand, generally cannot be executed within a multi-tenant computing environment since they are designed to be executed on premise and to handle one-tenant at a time.

BRIEF SUMMARY

In one embodiment, a method for migrating a legacy application to a multi-tenant computing environment is disclosed. The method comprises instantiating at least one virtualized computing container on a host system in a multi-tenant computing environment. An instance of the legacy application is executed within the virtualized computing container. The legacy application having been initially configured to run on premise and serve one tenant at a time. The virtualized computing container securely isolates the executing instance of the legacy application from other executing instances of the legacy application. At least one request received from a first client is sent to the instance of the legacy application executing within the virtualized computing container. The virtualized computing container is quiesced based on at least one quiescing criterion having been satisfied by the instance of the legacy application.

In another embodiment, an information processing system for migrating a legacy application to a multi-tenant computing environment is disclosed. The information processing system comprises memory and a processor communicatively coupled to the memory. A resource manager is communicatively coupled to the memory and the processor. The resource manager is configured to perform a method. The method comprises instantiating at least one virtualized computing container on a host system in a multi-tenant computing environment. An instance of the legacy application is executed within the virtualized computing container. The legacy application having been initially configured to run on premise and serve one tenant at a time. The virtualized computing container securely isolates the executing instance of the legacy application from other executing instances of the legacy application. At least one request received from a first client is sent to the instance of the legacy application executing within the virtualized computing container. The virtualized computing container is quiesced based on at least one quiescing criterion having been satisfied by the instance of the legacy application.

A computer program product for migrating a legacy application to a multi-tenant computing environment is disclosed. The computer program product comprises a computer readable storage medium having program instructions embodied therewith. The program instruction executable by a processor to cause the processor to perform a method. The method comprises instantiating at least one virtualized computing container on a host system in a multi-tenant computing environment. An instance of the legacy application is executed within the virtualized computing container. The legacy application having been initially configured to run on premise and serve one tenant at a time. The virtualized computing container securely isolates the executing instance of the legacy application from other executing instances of the legacy application. At least one request received from a first client is sent to the instance of the legacy application executing within the virtualized computing container. The virtualized computing container is quiesced based on at least one quiescing criterion having been satisfied by the instance of the legacy application.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Operating Environment

Figure 1:
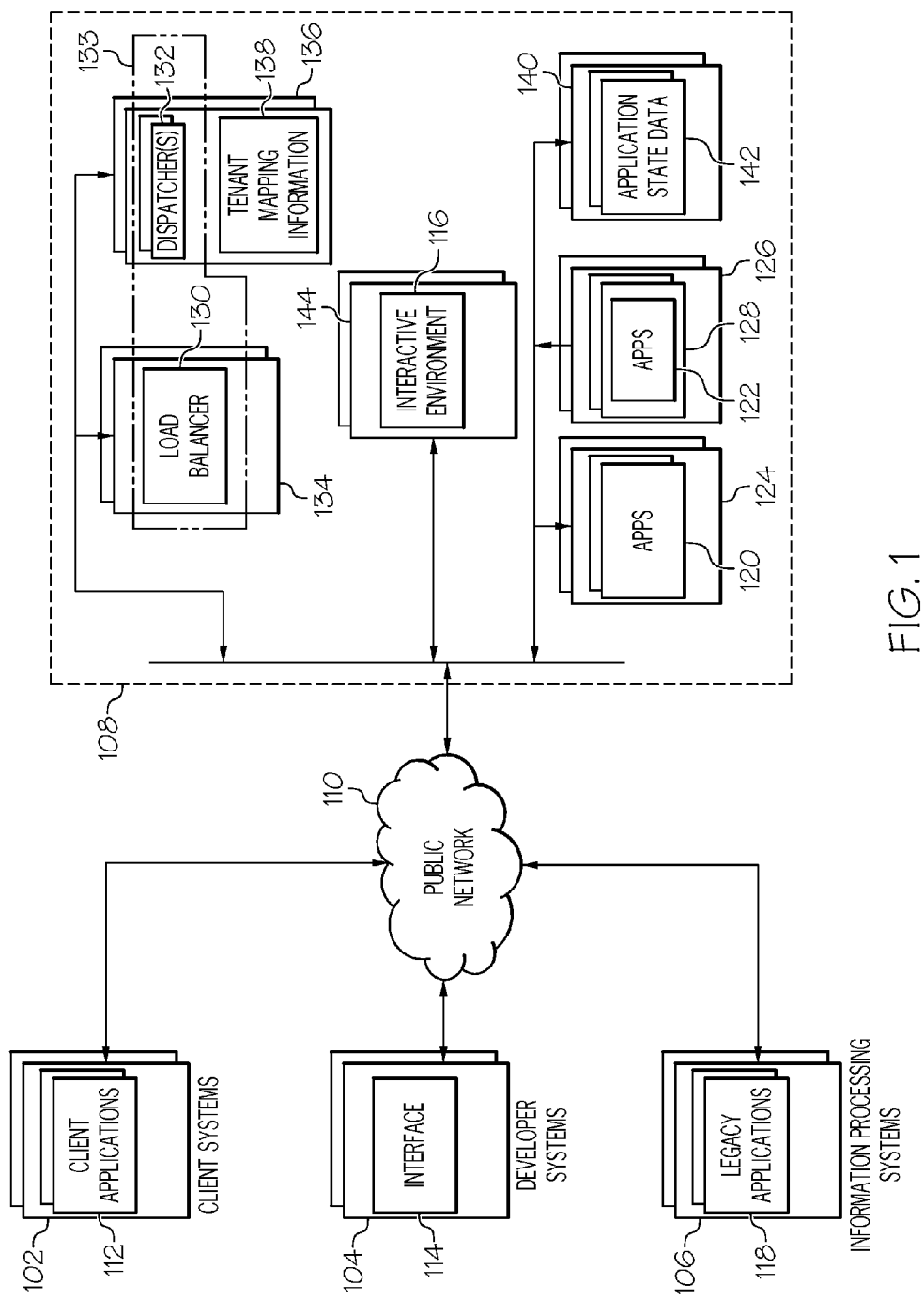
FIG. 1 is a block diagram illustrating one example of an operating environment according to one embodiment of the present disclosure.

FIG. 1 shows one example of an operating environment 100 for migrating legacy applications to multi-tenancy computing environments. In particular, FIG. 1 shows one or more information processing systems 102, 104, 106 communicatively coupled to one or cloud computing environments 108 via a public network 110 such as the Internet. It should be noted that although the following discussion utilizes the example of a cloud computing environment, various embodiments are not limited to cloud computing environments and are applicable to non-cloud computing environments as well.

One or more of the information processing systems 102 include client systems comprising client applications 112 requesting and accessing resources within the computing environment 108. Examples of client applications 112 include, but are not limited to, web browsers, web applications, developer applications, and/or the like. At least one of the information processing systems 104 comprises an interface 114 allowing a user such as a developer to access an interactive environment 116 of the computing environment 108. In another embodiment, users access the interactive environment 116 programmatically via an application programming interface (API). The interactive environment 116 allows for the user to, among other things, migrate legacy applications 118 to the computing environment 108. A legacy application is any application that was not originally designed and configured for a multi-tenancy computing environment such as a cloud computing environment. In particular, a legacy application/code is any software application designed to run on premise (i.e., not designed to run as a cloud service) and to handle one tenant at a time. Legacy applications generally do not support the following properties: full isolation among users; scalability, elasticity, fault-tolerance, and high availability; high density of users; and quiescing to save resources when the system is idle.

The computing environment 108, in one embodiment, provides various resources such as applications 120, 122 and computing resources to clients 112. Computing resources include but are not limited to, processing, storage, networking, and other fundamental computing resources. Resources are provided by and/or are hosted on a plurality of physical information processing systems 124, 126 and/or a plurality of virtualized computing environments 128 being executed by physical systems 124, 126. Examples of virtualized computing environments 128 include virtual machines and containers. A virtual machine is an emulation of a given computing system (hardware and software) and operates based on the architecture and functions of the given computing system. A virtual machine comprises its own operating system that is separate from the operating system of the host machine. A container, such as a Docker container, is an operating system level virtualization where the kernel of the operating system allows for multiple isolated user space instances instead of just one. A container does not require a separate operating system from that of its host. Containers utilize the kernel's functionality and resource isolation along with separate namespaces to completely isolate an application's view of the operation system.

Containers comprising applications 122 can be executed and run on physical machines 124, 126 or on virtual machines. Containers allow applications to be presented in a multi-tenancy computing environment. A Multi-tenancy computing environment allows for a single instance of software to be executed on a physical information processing system or a virtualized computing environment while serving multiple tenants. This is in contrast to a multi-instance architecture where separate software instances are deployed for different tenants. A tenant a user or application that shares the same view of the software with other tenants, each requiring its own exclusive, secure, and isolated computing environment. The tenants share the same application that is running on the same operating system and hardware. However, each tenant is provided a dedicated share of software instance including its data, configuration, user management, and the like. Each tenant's dedicated share is isolated from each other such that the tenant's cannot see or manipulate each other's data.

In addition to the resources, the computing environment 108 also comprises at least one load balancer 130 and at least one dispatcher 132 distributed across one or more information processing systems 134, 136. The load balancer 130 and the dispatcher 132 are collectively referred to herein as the "resource manager 133". The load balancer 130 receives requests for the resources of the computing environment 108 from the client applications 112. The load balancer 130 utilizes one or more balancing mechanisms to select a dispatcher 132 to forward the requests to. The dispatcher 132 then sends the request to the appropriate virtualized computing environment 128 associated with the request. As will be discussed in greater detail below, the dispatcher 132 creates and maintains tenant mapping information 138 identifying which virtualized computing environment is associated with a given tenant. This allows for the dispatcher 132 to send a request to the appropriate virtualized computing environment 128.

The computing environment 108 further comprises one or more information processing systems 140 that include application state data 142. The application state data 142 is generated by the applications 120, 122 executing within the environment 108 and stored within a persistent store provided by the information processing systems 140. The applications 120, 122 or instances of applications generate the state data 142 at various points of time of their operation such as upon startup, upon exit or completion, and any time there between. The state data 142 allows for the application or a given instance of the application to resume its operation at the time the state data 142 was saved. When the application exits for whatever reason the state data 142 contains everything that is needed by the newly started application to restore its state in memory and continue execution from the restored state. The computing environment 108 also comprises one or more information processing systems 144 comprising the interactive environment 116. The interactive environment 116, in one embodiment, is a website, web application, mashup, and/or the like that allows a user to create, manage, and migrate applications for user within the computing environment 108.

Migrating Legacy Applications to a Multi-Tenancy Computing Environment

Most of the applications provided by cloud computing environments and/or multi-tenancy computing environments are specifically designed for cloud computing environments and/or multi-tenancy computing environments. However, many clients and potential clients have legacy applications 118 that they would like to execute within these types of computing environments. Therefore, one or more embodiments provide a system for migrating these legacy applications to a cloud computing environment and/or multi-tenancy computing environment.

In one embodiment, a user accesses the interactive environment 116 via the interface 114 provided by the user system 104. The interactive environment 116 receives an indication from the user that the user desires to migrate a legacy application 118 to the computing environment 108. For example, the user desires to migrate the legacy application 218 shown in FIG. 2. In this example, the legacy application 218 is a Java-based workflow engine that runs in a servlet container (e.g., Tomcat or Websphere running workflow engine packaged as .war). The engine exposes a number of REST interfaces to deploy and invoke workflows, and has a pluggable persistence layer with support for persistence to a files system or relational database. The engine was designed to be deployed on dedicated resources for a single organization, and always be running.

Figure 3:
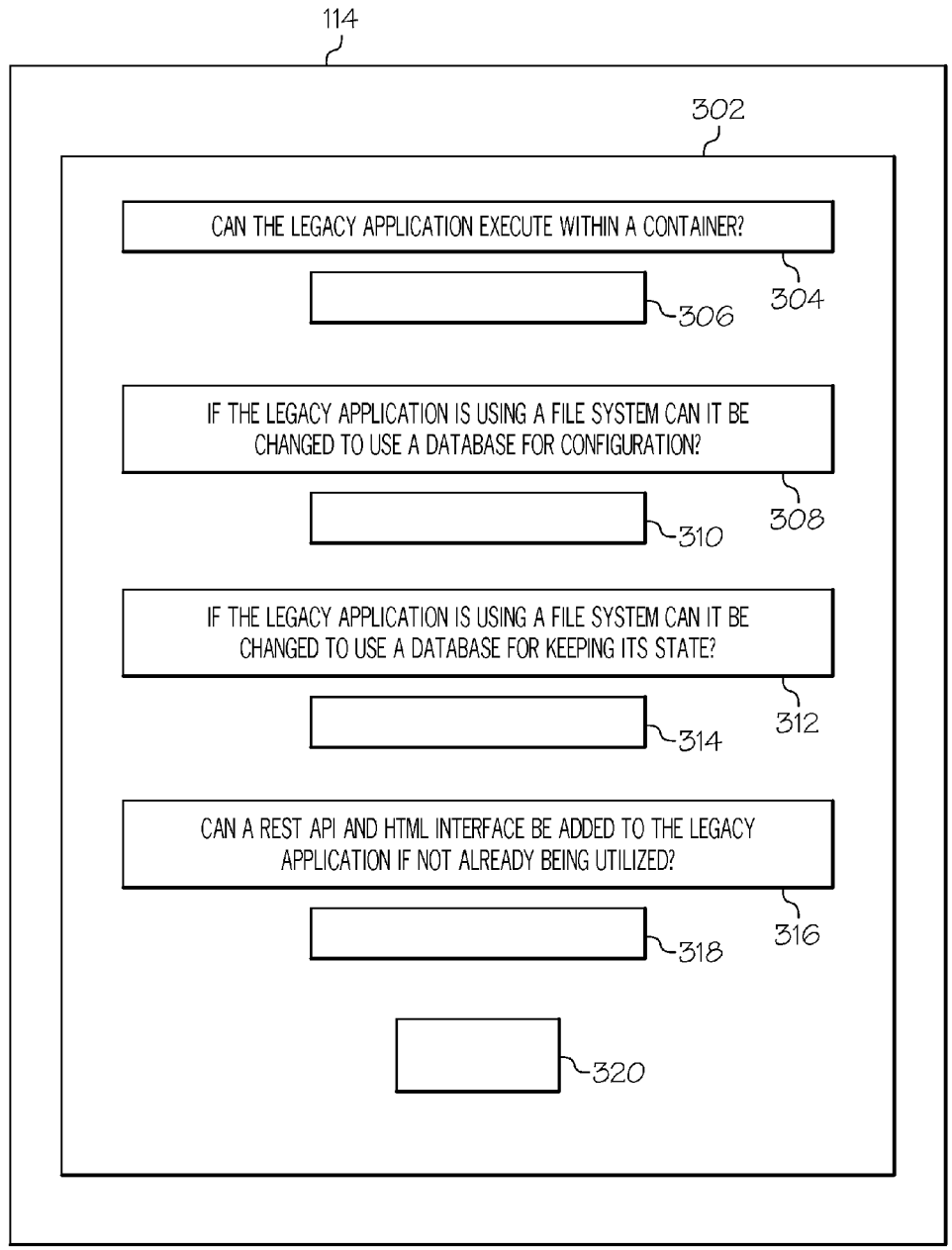
FIG. 3 illustrates one example of a user interface presenting a series of prompts to a user for determining whether a legacy application can be migrated to a multi-tenant computing environment according to one embodiment of the present invention.

Once the interactive environment 116 receives an indication from the user that the user desires to migrate the legacy application 218, the interactive environment 116 presents a plurality of prompts to the user to determine whether the legacy application 218 can be migrated to the computing environment. FIG. 3 shows one example of prompts being presented to the user via a webpage 302 displayed by the interface 114. In this example, the interactive environment 116 presents a first prompt 304 to the user asking if the legacy application be executed within a container. The user is able to provide his/her answer within a first answer field 306. The interactive environment 116 presents a second prompt 308 to the user asking whether the legacy application can be changed to use a database for configuration if it is currently using a file system for configuration. If a file system is used for configuration then the file locations and their content need to be identified. The user is able to provide his/her answer within a second answer field 310. The interactive environment 116 presents a third prompt 312 to the user asking whether the legacy application can be changed to use a database for saving its state if it is currently using a file system to save its state. The user is able to provide his/her answer within a third answer field 314. The interactive environment 116 presents a fourth prompt 316 to the user asking whether a REST API and a HTML interface can be added to the legacy application if it currently does not comprise a REST API or a HTML interface, respectively. The user is able to provide his/her answer within a fourth answer field 318.

The interactive environment 116 receives the answers to above prompts from the user and the resource manager 133 analyzes the received answers. If the user answered in the negative to any of the prompts the resource manager 133 determines that the legacy application cannot be migrated to the computing environment 108. In the current example, the user determines that the legacy application 218 can be migrated to the computing environment since it satisfies all of the requirements (as set forth in the prompts) presented by the interactive environment 116. The result of this determination is presented to the user via the interface 114 in a given area 320 of the webpage 302.

It should be noted that instead presenting the above prompts to the user, the resource manager 133 can analyze the legacy application and/or a specification or model of the application to automatically determine whether the legacy application can be migrated to the computing environment 108. For example, the user, via the interface 114, can upload the legacy application to the computing environment 108, send a link with the location of the legacy application, and/or send a specification file and/or model of the application to the resource manager 133. The resource manager 133 analyzes the legacy application, specification of the application, and/or the model of the application to identify various attributes and characteristics of the legacy application. The resource manager 133 can also analyze the source code of the legacy application if available. Based on this analysis the resource manager 133 determines 1.) if the legacy application be executed within a container; 2.) if the legacy application can be changed to use a database for configuration if it is currently using a file system for configuration 3.) if the legacy application can be changed to use a database for saving its state if it is currently using a file system to save its state; and 4.) if a REST API and a HTML interface can be added to the legacy application if it currently does not comprise a REST API or a HTML interface, respectively. If the resource manager 133 determines that legacy application fails to satisfy any of the above requirements it notifies the user that the application cannot be migrated to the computing environment 108. If the resource manager 133 determines that legacy application fails satisfies all of the above requirements it notifies the user that the application can be migrated to the computing environment 108.

Once a determination is made that a legacy application 118 is migratable to the computing environment 108 the user or an automated agent such as the resource manager 133 adds a REST API and/or HTML interface to the legacy application 118 if not already included within the application 118. With respect to adding a REST API and/or HTML interface to the legacy application 118 it is necessary to determine how the application is interacting with its environment and replace it with a REST API and a HTML user interface. The REST API and HTML interface are necessary to make the legacy application 118 accessible through the resource manager 133 as it requires uniform representation of the application resources so it can perform load balancing and dispatch requests.

If the legacy application 118 is currently utilizing a file system for configuration, the user or the resource manager 133 changes the application 118 to utilize a database for the configuration. For example, the user or the resource manager 133 changes the source code of the application 118 to use a database for configuration by replacing all file open and store operation with database operations that use file paths and names as database storage keys.

If the legacy application 118 is currently utilizing a file system for saving its state, the user or the resource manager 133 changes the application 118 to utilize a database for saving its state. For example, the user or the resource manager 133 changes the source code of the application 118 to use a database for configuration by replacing all file open and store operation with database operations that use file paths and names as database storage keys.

Once the above changes are made (if required), an image (s) comprising the legacy application 118 and its dependencies is created by the user or the resource manager 133 for executing the application 118 within a container. An image, such as a Docker image, is a read-only template comprising the executable source code of the legacy application 118, its dependencies (e.g., executables of required web server, database, etc.), and its required operating system. The image is utilized by the resource manager 133 to launch a container, which maintains everything required for the application 118 to run. An image comprises a series of layers that are combined into a single image utilizing, for example, union file systems.

A container comprises an operating system, user-added files (e.g., application source code), and meta-data. A container is built from an image, which tells the resource manager 133 what the container holds, what process to run when the container is launched, and a variety of other configuration data. When a container is run from an image, a read-write layer is added on top of the image in which the application can then run. When the resource manager 133 launches container, the operating system image associated with the container is retrieved and the container is created utilizing this image. A file system is allocated and a read-write layer is mounted, where the container is created in the file system and the read-write layer is added to the single image. A network interface is also created that allows the container to communicate with the local host. An Internet Protocol (IP) address is assigned to the container, and the application 118 is run utilizing the executable source code in the image.

Figure 2:
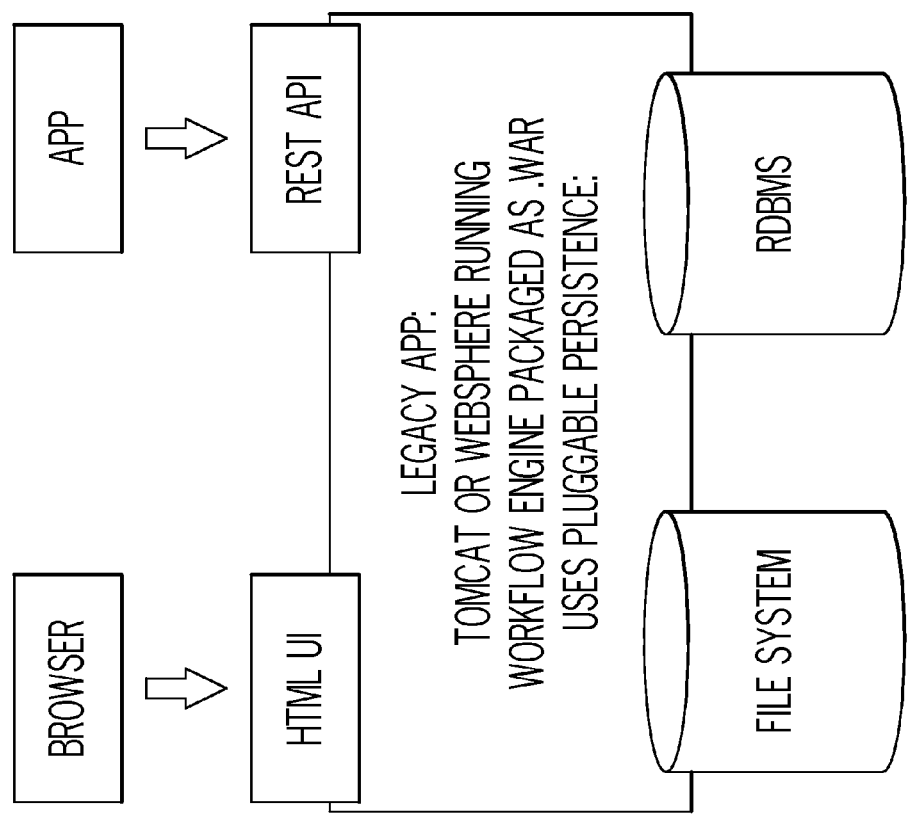
FIG. 2 illustrates one example of a legacy application according to one embodiment of the present invention.
Figure 4:
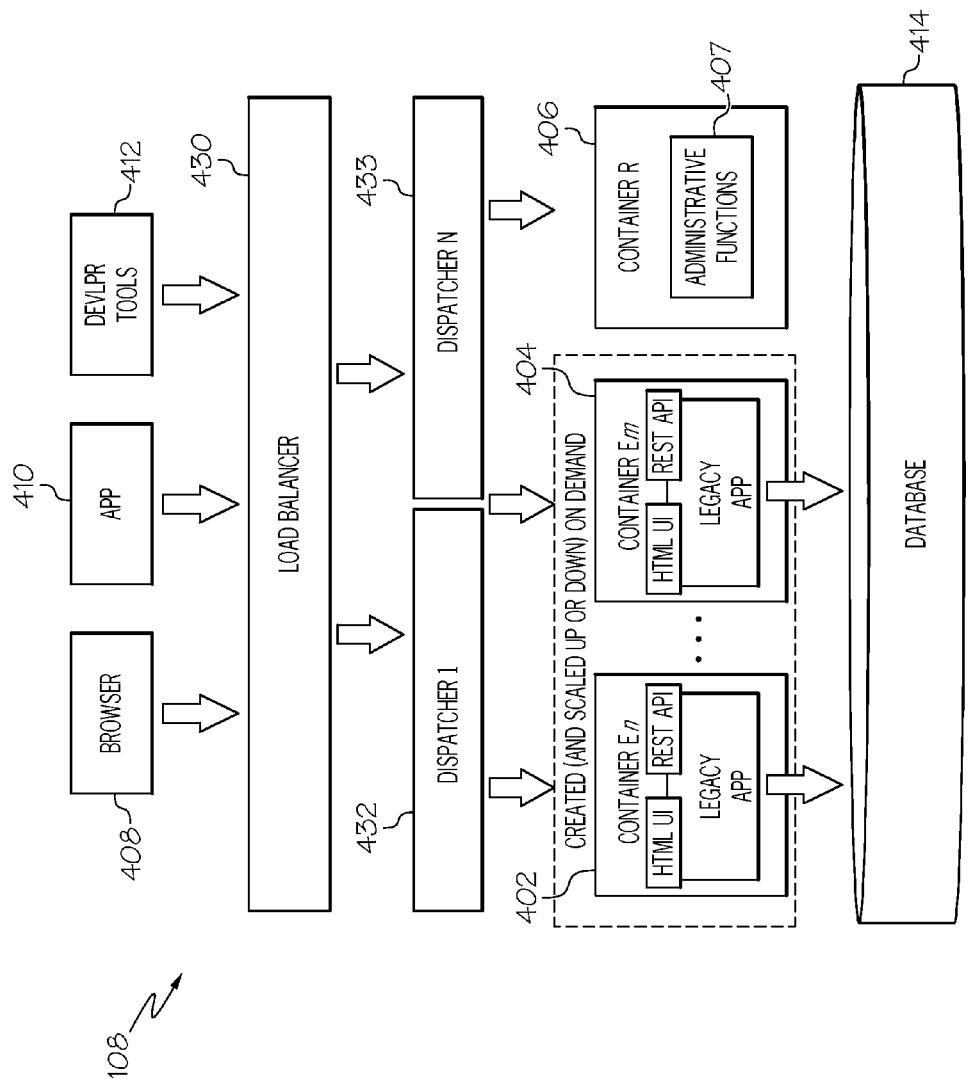
FIG. 4 illustrates one example of a multi-tenant computing environment executing multiple instances of a legacy application according to one embodiment of the present invention.

FIG. 4 shows one example of running the legacy application 218 of FIG. 2 in the computing environment 108 of FIG. 1 utilizing multiple containers. In FIG. 4, a plurality of containers 402, 404, 406 are shown. A separate container 402, 404 with a given instance of the legacy application 218 has been instantiated for each tenant requesting access to the application 218, where each container 402, 404 is securely isolated from the other. In other words, any data being accessed or generated by an instance of legacy application 218 in a given container; any processes being executed by an instance of legacy application 218 in a given container; and or the like are not accessible by other clients or other instances of the legacy application executing in other containers. In addition to security isolation, performance isolation is also provided by the containers. For example, the computer processing unit (CPU), memory, and network consumption of each tenant can be separately restricted for each container 402, 404. One or more additional containers 406 can be utilize the perform administrative functions 407 such as managing data for multiple tenants.

FIG. 4 shows that a load balancer 430 is disposed between the clients/tenants 408, 410, 412 and a plurality of dispatchers 432, 433. A plurality of dispatches 432, 433 is disposed within the computing environment 400 for reliability. The load balancer 430 receives requests such as Hyper Text Transfer Protocol (HTTP) requests from a tenant 408, 410, 412 for interaction with the legacy application 218. The load balancer 430 utilizes one or more load balancing algorithms to select one of the plurality of dispatchers 432, 433. The load balancer 430 then sends the received request to the selected dispatcher 432. The dispatcher 432 receives the and analyzes the request from the load balancer 430. For example, an extraction component (or script) of the dispatcher 432 analyzes the request to extract the tenant identifier (ID) within the request. The tenant ID uniquely identifies the tenant who sent the request. In one embodiment, the tenant ID is embedded within the uniform resource locator (URL) of the request.

Figure 5:
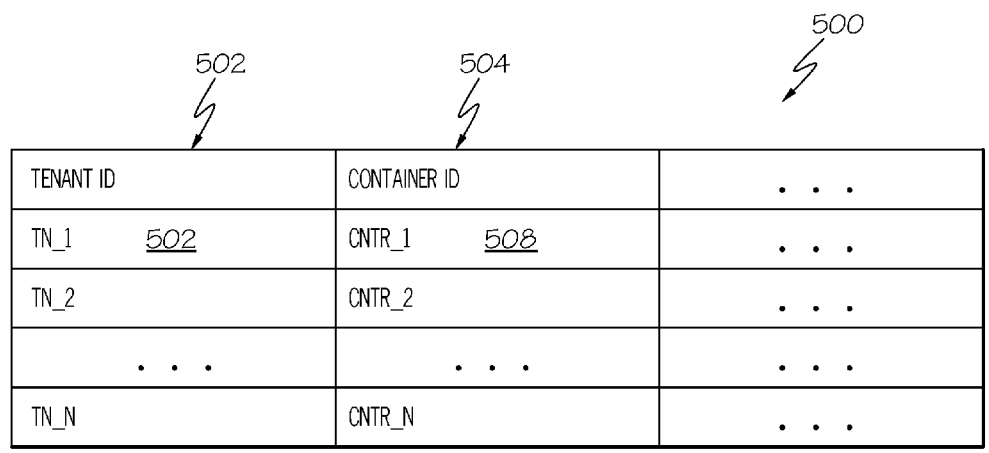
FIG. 5 shows one example of mapping information that maps tenants to containers according to one embodiment of the present invention.

The dispatcher 432 compares the tenant ID to data stored within the tenant mapping information 138 maintained by the dispatchers 432, 433. The tenant mapping information 138 comprises mappings between tenant IDs and container IDs, which uniquely identify currently running containers. FIG. 5 shows one example of tenant mapping information. In particular, FIG. 5 shows a table 500 where each row is a record associated with a given mapping between a tenant and a container. In this example, the table 500 comprises a first column 502 entitled "Tenant ID" and a second column 504 entitled "Container ID. Entries 506 under the first column 502 comprise a tenant ID uniquely identifying a given tenant. Entries 508 under the second column 504 comprise a container ID uniquely identifying a given container.

When the dispatcher 432 compares the tenant ID to the tenant mapping information 138 it determines if an entry exists within the mapping information 138 comprises the tenant ID extracted from the request. If match exists, the dispatcher 432 identifies the container ID associated with the tenant ID and sends the request to the container 402 associated with the container ID for processing. If a match does not exist (a container is not currently running that is associated with the tenant), the dispatcher 432 starts a container 404 dynamically (on the fly) with an instance of the application 218 for the requesting tenant. The dispatcher 432 also adds entries in the mapping information 138 mapping the tenant to the started container. For example, the dispatcher 432 adds entries comprising the tenant ID of the tenant and the container ID of the started container within the same record of the table 500.

It should be noted that embodiments are not limited to starting a single container with an instance of the application 218 for a given tenant. For example, multiple containers can be started and running for a tenant. However, in some instances, the application 218 may be state-full, i.e., there is state or a relationship between multiple requests received from a tenant. In this situation, each of the related requests comprises an instance ID that is common amongst the related requests. Instance ID used together with tenant ID allows ensures that all requests are sent to the same container as long as they have the same tenant ID and instance ID. By using instance ID for dispatching all requests with the same instance ID to the same container (as there can be more than one) the application can perform all of the computations and modify state related to that instance ID without being concerned that multiple requests have fragmented state of the instance ID across multiple containers. The dispatcher 432 tracks the relation between requests for multiple containers associated with a given tenant. For example, in addition to maintaining tenant and container IDs in the mapping information 138 the dispatcher 432 also maintains instance IDs that it extracts from the requests, as shown in FIG. 6.

Figure 6:
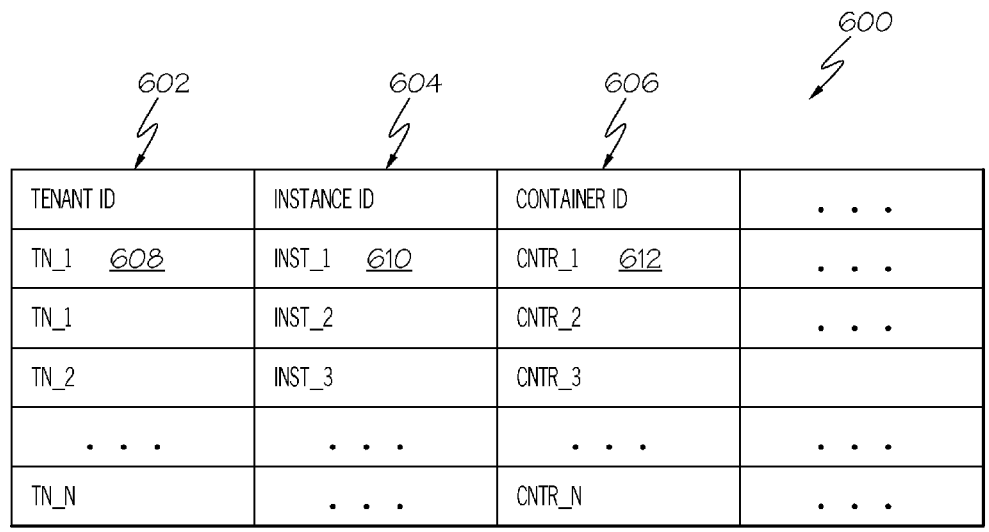
FIG. 6 shows another example of mapping information that maps tenants to containers based on related requests received from each tenant according to one embodiment of the present invention.

In particular, FIG. 6 shows a table 600 where each row is a record associated with a given mapping between a tenant, a container, and an instance of the application 218. In this example, the table 600 comprises a first column 602 entitled "Tenant ID" and a second column 604 entitled "Container ID, and a third column 606 entitled "Instance ID". Entries 608 under the first column 602 comprise a tenant ID uniquely identifying a given tenant. Entries 610 under the second column 604 comprise a container ID uniquely identifying a given container. Entries 612 under the third column 606 comprise an instance ID identifying the given instance of the application 218 associated with the container identified in the record. FIG. 6 shows that a single tenant can be associated with multiple containers, but only a single container is associated with a given instance ID.

When the dispatcher 432 receives a request with tenant and instance IDs, the dispatcher 432 compares these IDs to the mapping information 138 to determine which container to send the request to. If a match exists, the dispatcher 432 sends the request to the container identified from the mapping information 138. This ensures that the same container receives requests associated with the same instance ID. If a match does not exist (a container associated with the tenant and instance is not currently running) the dispatcher determines if there is another container currently running that is associated with the tenant ID. If so, the dispatcher 432 sends the request to this container and updates the mapping information 138 to associate the instance ID with this container. If not, the dispatcher 432 starts a new container with an instance of the application 218 and updates the mapping information to map the tenant ID and instance ID to the ID of the newly started container.

In one or more embodiments, the legacy application 218 is modified as part of the migration process to save its state a persistent store such as a database 412 as part of the application state data 142, and exit. For example, code is added to the source code of the legacy application 218 providing the legacy application with this capability. In one embodiment, the legacy application 218 is configured to save its state and exit (the container 402 executing the application 218 stops running) when it determines that all requests have been processed and no requests are pending. The dispatcher 432 detects that the container 402 has exited and removes the corresponding tenant-container mapping from the mapping information 138.

In some instances the legacy application 218 may not be able to be modified to exit such that its container 402 stops running so that resources can be reclaimed. In this situation, the REST API added to the application 218 can be configured to notify the dispatcher if the container 402 is idle (not processing any requests). If the dispatcher 432 determines that a container 402 is idle based on a notification from the container's REST API, the dispatcher stops/quiesces the container 402 to reclaim resources. The dispatcher 432 removes the corresponding tenant-container mapping from the mapping information 138. In embodiments where a single container is provisioned for a given tenant, the dispatcher 432 verifies that the old container has been fully stopped prior to starting a new container for the tenant. This determination can be made, for example, by verifying that all network connections associated with the old container have been closed.

It should be noted that embodiments of the present disclosure are not limited to executing legacy applications in computing environments utilizing containers. For example, a legacy application can be provided to clients via separate virtual machines. However, containers have some advantages over virtual machines. In particular, containers are lightweight and allow for high density and elasticity while utilizing less resources than virtual machines. Containers allow for running many instances of an application on the same host with multiple tenants. The use of virtual machines makes it more difficult to perform the on demand start and stop operations discussed above since the startup times of virtual machines is in the order of minutes. A pool of "warmed up" applications in virtual machines would need to be managed along with logic to recycle the virtual machines and ensuring previous tenant data is purged during the process.

Operational Flow Diagram

Figure 7:
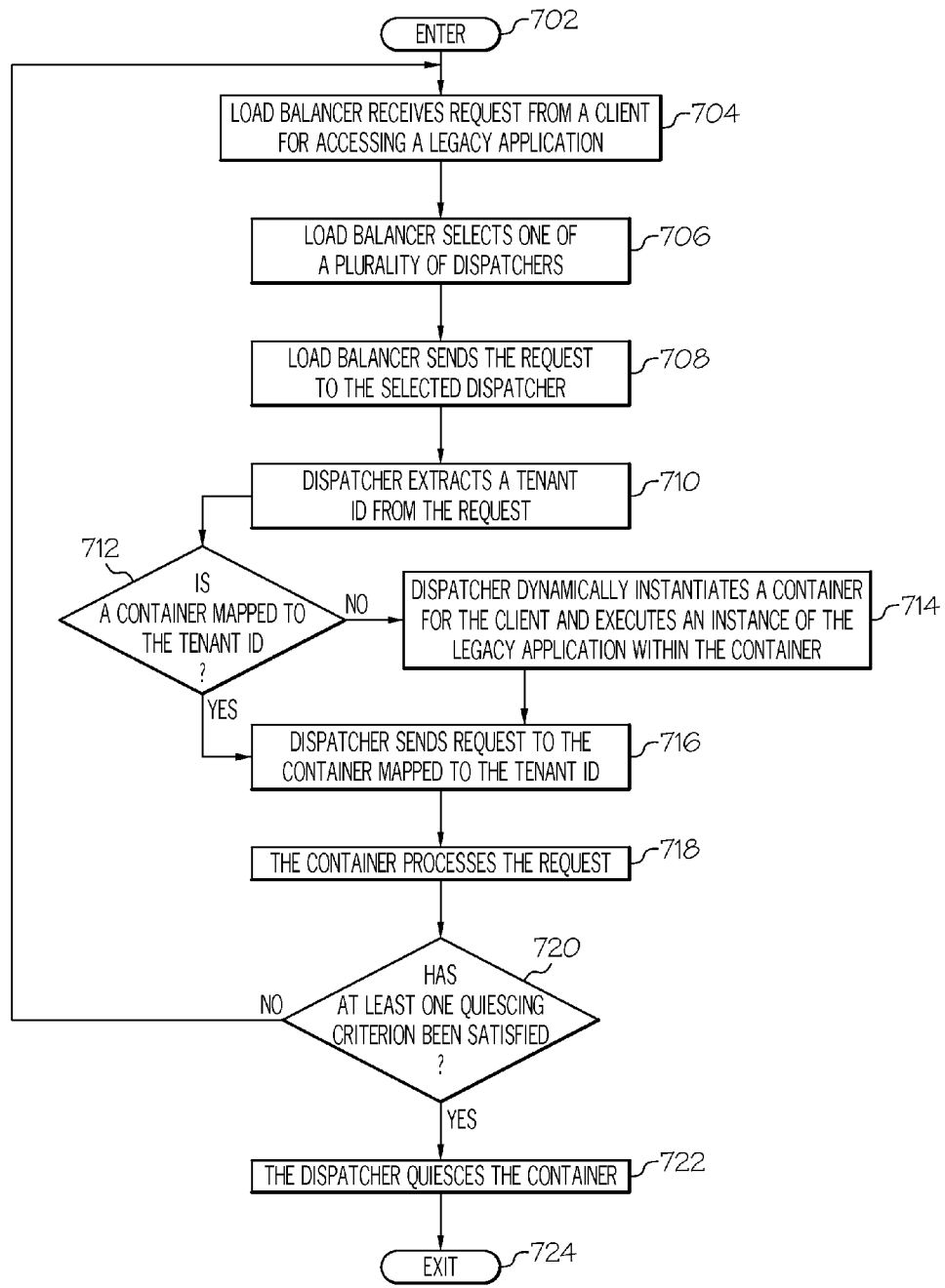
FIG. 7 is an operational flow diagram illustrating one example of migrating and executing a legacy application in a multi-tenant computing environment according to one embodiment of the present disclosure.

FIG. 7 is an operational flow diagram illustrating one example of migrating and executing a legacy application in a multi-tenant computing environment. The operational flow diagram of FIG. 7 begins at step 702 and flows directly to step 704. The load balancer 130, at step 704, receives a request from a client for accessing a legacy application 118. The load balancer 130, at step 706, selects one of a plurality of dispatchers 132. The load balancer 130, at step 708, sends the request to the selected dispatcher 132. The dispatcher 132, at step 710, extracts a tenant ID from the request that uniquely identifies the client.

The dispatcher 132, at step 712, determines if a virtualized computing container 402 is currently mapped to the tenant ID. If the result of this determination is positive, the dispatcher 132, at step 716, sends the request to the container 402. If the result of the determination is negative, the dispatcher 132, at step 716, dynamically instantiates a container 402 for the client and executes an instance of the legacy application 118 within the container 402. The dispatcher 132 then sends the request to the container at step 716. The container 402, at step 718, processes the request. The dispatcher 132, at step 720, determines if a least one quiescing criterion has been satisfied by the instance of the legacy application. If the result of this determination is negative, the control flows back to step 704. If the result of this determination is positive, the dispatcher 132, at step 722, quiesces the container 402. The control flow exits at step 722.

Figure 8:
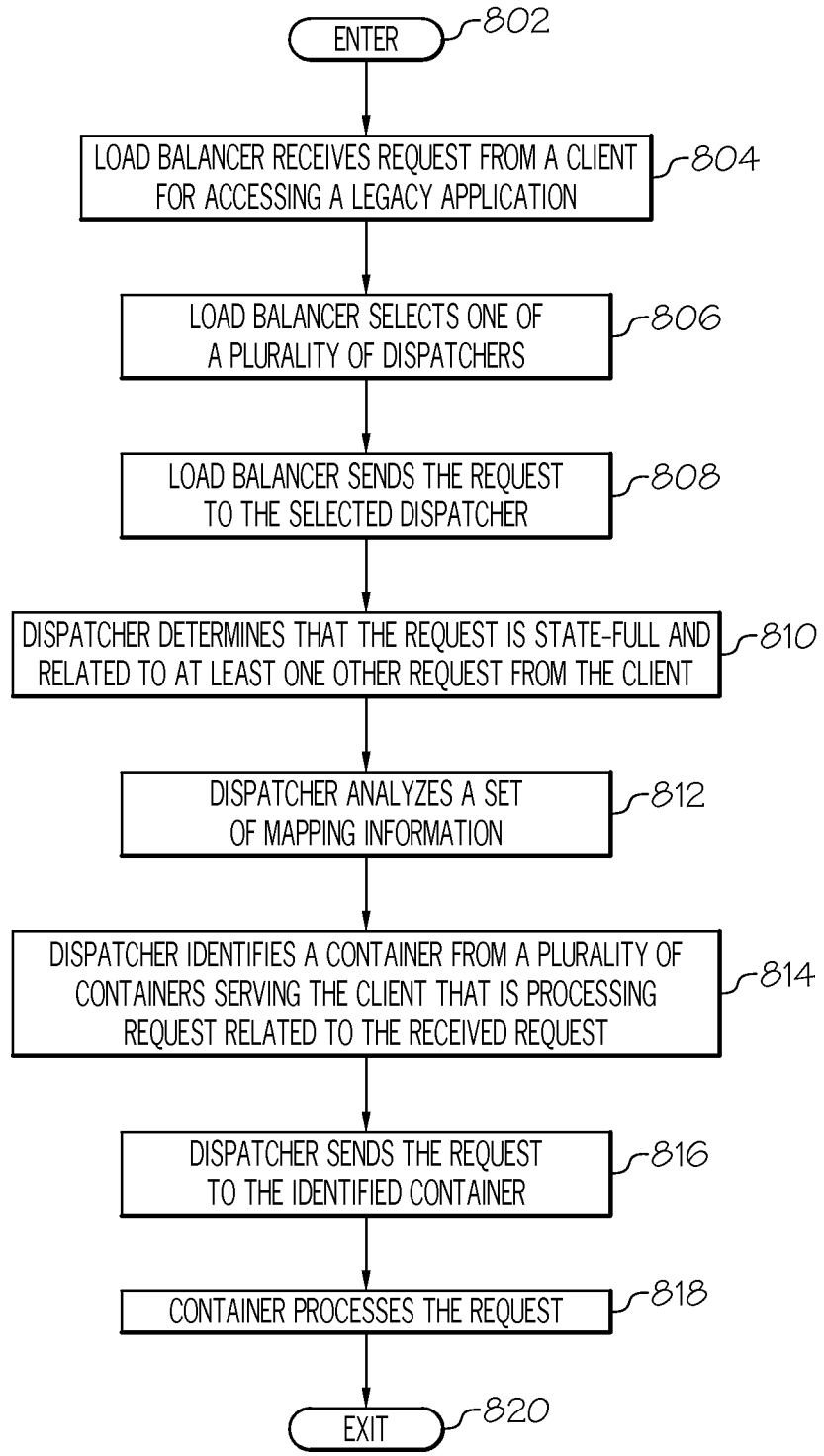
FIG. 8 shows another example of mapping information that maps tenants to containers according to one embodiment of the present invention.

FIG. 8 is an operational flow diagram illustrating another example of migrating and executing a legacy application in a multi-tenant computing environment. The operational flow diagram of FIG. 8 begins at step 802 and flows directly to step 804. The load balancer 130, at step 804, receives a request from a client for accessing a legacy application 118. The load balancer 130, at step 806, selects one of a plurality of dispatchers 132. The load balancer 130, at step 808, sends the request to the selected dispatcher 132. The dispatcher 132, at step 810, determines that the request is state-full and related to at least one other request from the client. The dispatcher 132, at step 812 analyses a set of mapping information 138 that maps each of a set of clients to a set of virtualized computing containers and further maps each of the set of virtualized computing containers to a set of related requests.

The dispatcher 132, at step 814, identifies a container 402 from a plurality of containers serving the client that is processing the requests related to the received request. The dispatcher 132, at step 816, sends the request to the identified container 402. The container 402 processes the request. The control flow exits at step 820.

Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned, and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
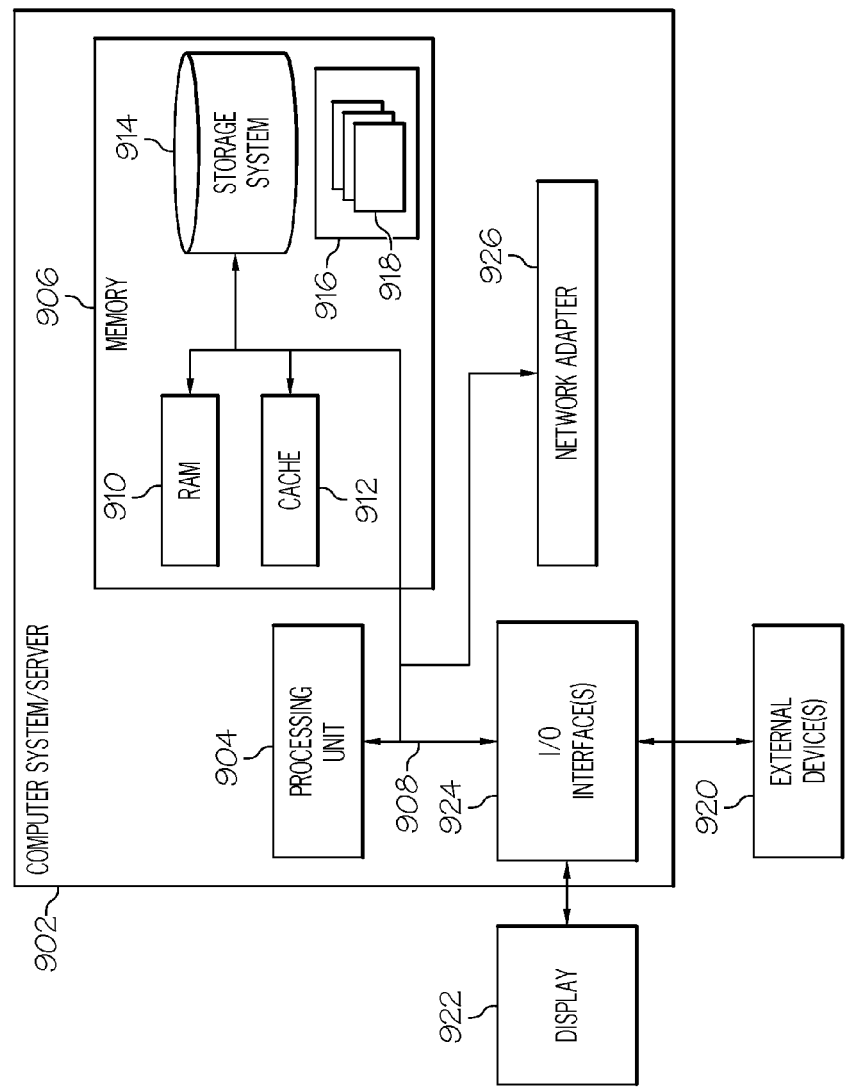
FIG. 9 illustrates on example of a cloud computing nodes according to one embodiment of the present disclosure.

Referring now to FIG. 9, a schematic of an example of a cloud computing node is shown. Cloud computing node 900 is only one example of a suitable cloud computing node and is not intended to suggest any limitation as to the scope of use or functionality of embodiments of the invention described herein. Regardless, cloud computing node 900 is capable of being implemented and/or performing any of the functionality set forth hereinabove. In one embodiment, the cloud computing node 900 is one of the nodes within the environment 100 discussed above.

In cloud computing node 900 there is a computer system/server 902, which is operational with numerous other general purpose or special purpose computing system environments or configurations. Examples of well-known computing systems, environments, and/or configurations that may be suitable for use with computer system/server 902 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 902 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 902 in cloud computing node 900 is shown in the form of a general-purpose computing device. The components of computer system/server 902 may include, but are not limited to, one or more processors or processing units 904, a system memory 906, and a bus 908 that couples various system components including system memory 906 to processor 904. Although not shown in FIG. 9, the resource manager 133 and its components or one or virtualized computing containers 402, 404 can reside within the system memory 906 and/or the processor 904. These components can also be a separate hardware component as well.

Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media. System memory 906 can include computer system readable media in the form of volatile memory, such as random access memory (RAM) 910 and/or cache memory 912. Computer system/server 902 may further include other removable/non-removable, volatile/non-volatile computer system storage media. By way of example only, storage system 914 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 906 may include at least one program product having a set (e.g., at least one) of program modules that are configured to carry out the functions of embodiments of the invention.

Program/utility 916, having a set (at least one) of program modules 918, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. Program modules 918 generally carry out the functions and/or methodologies of embodiments of the invention as described herein.

Computer system/server 902 may also communicate with one or more external devices 920 such as a keyboard, a pointing device, a display 922, etc.; one or more devices that enable a user to interact with computer system/server 902; and/or any devices (e.g., network card, modem, etc.) that enable computer system/server 902 to communicate with one or more other computing devices. Such communication can occur via Input/Output (I/O) interfaces 924. Still yet, computer system/server 902 can communicate with one or more networks such as a local area network (LAN), a general wide area network (WAN), and/or a public network (e.g., the Internet) via network adapter 930. As depicted, network adapter 926 communicates with the other components of computer system/server 902 via bus 908. It should be understood that although not shown, other hardware and/or software components could be used in conjunction with computer system/server 900. Examples, include, but are not limited to: microcode, device drivers, redundant processing units, external disk drive arrays, RAID systems, tape drives, and data archival storage systems, etc.

Figure 10:
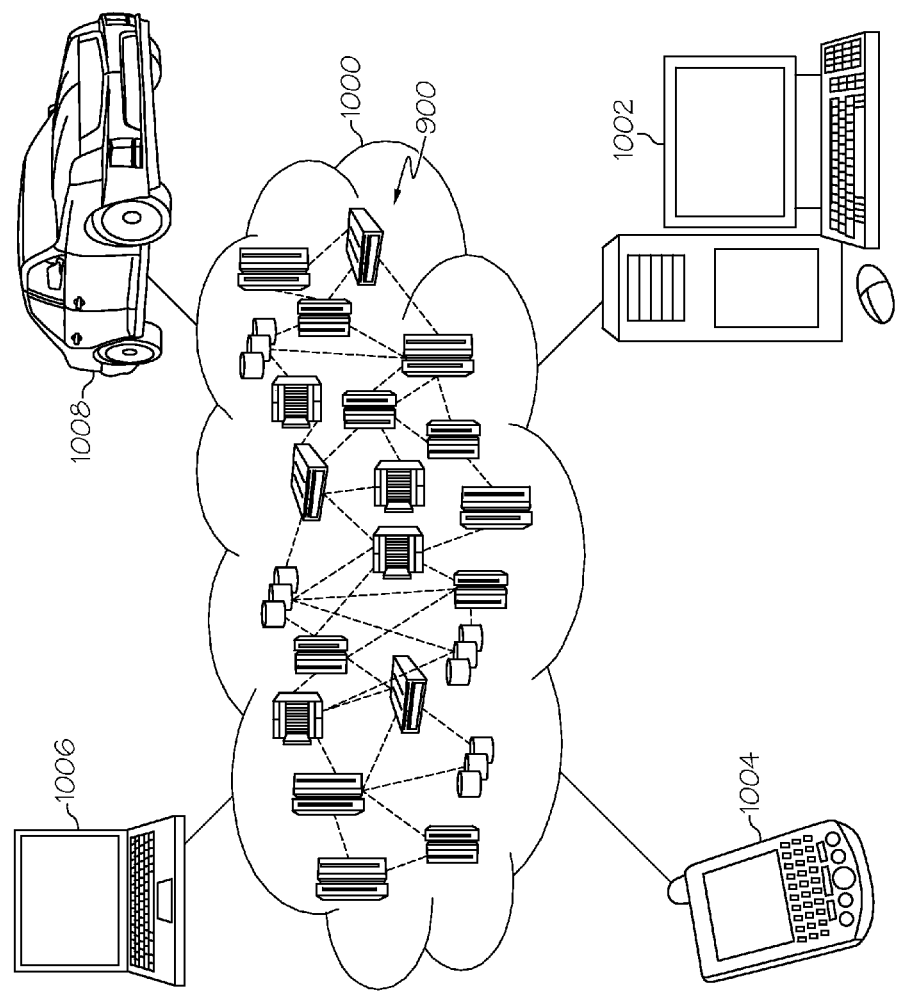
FIG. 10 illustrates one example of a cloud computing environment according to one embodiment of the present disclosure.

Referring now to FIG. 10, illustrative cloud computing environment 1000 is depicted. As shown, cloud computing environment 1000 comprises one or more cloud computing nodes 900 with which local computing devices used by cloud consumers, such as, for example, personal digital assistant (PDA) or cellular telephone 1002, desktop computer 1004, laptop computer 1006, and/or automobile computer system 1008 may communicate. Nodes 900 may communicate with one another. They may be grouped (not shown) physically or virtually, in one or more networks, such as Private, Community, Public, or Hybrid clouds as described hereinabove, or a combination thereof. This allows cloud computing environment 900 to offer infrastructure, platforms, and/or software as services for which a cloud consumer does not need to maintain resources on a local computing device. It is understood that the types of computing devices 1002-1008 shown in FIG. 10 are intended to be illustrative only and that computing nodes 900 and cloud computing environment 1000 can communicate with any type of computerized device over any type of network and/or network addressable connection (e.g., using a web browser).

Figure 11:
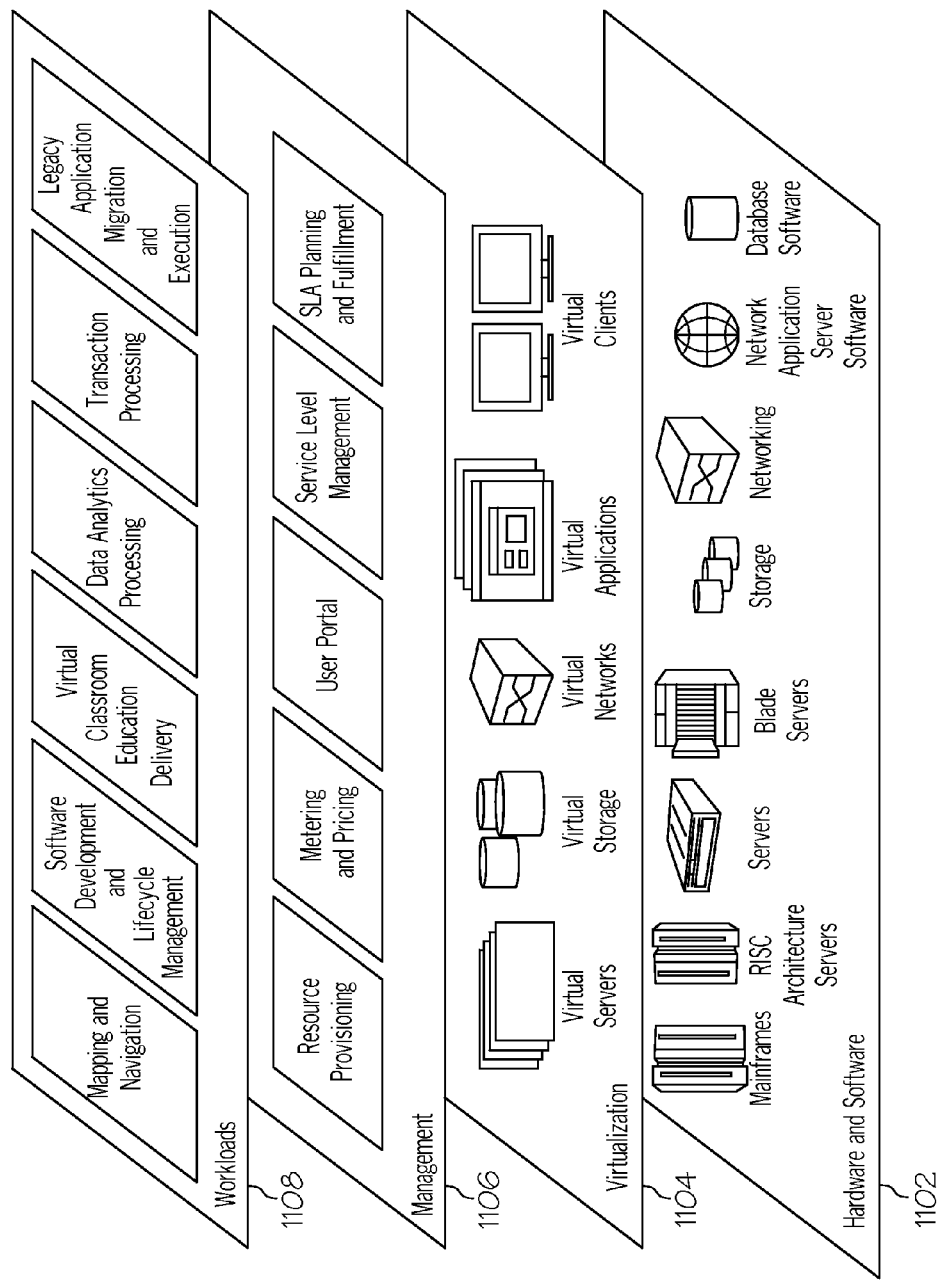
FIG. 11 illustrates one example of abstraction model layers according to one embodiment of the present disclosure.

Referring now to FIG. 11, a set of functional abstraction layers provided by cloud computing environment 1000 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1102 includes hardware and software components. Examples of hardware components include: mainframes; RISC (Reduced Instruction Set Computer) architecture based servers; storage devices; networks and networking components. In some embodiments, software components include network application server software.

Virtualization layer 1104 provides an abstraction layer from which the following examples of virtual entities may be provided: virtual servers; virtual storage; virtual networks, including virtual private networks; virtual applications and operating systems; and virtual clients.

In one example, management layer 1106 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1108 provides examples of functionality for which the cloud computing environment may be utilized. Examples of workloads and functions which may be provided from this layer include: mapping and navigation; software development and lifecycle management; virtual classroom education delivery; data analytics processing; transaction processing; and legacy application migration and execution.

Non-Limiting Examples

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer maybe connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for migrating a legacy application to a multi-tenant computing environment, the method comprising:
    analyzing a set of attributes associated with the legacy application;
    determining, based on analyzing the set of attributes, if the legacy application satisfies a plurality of migration criteria for migrating the multi-tenant computing environment;
    in response to determining that the legacy application fails to satisfy the plurality of migration criteria, notifying a user that the legacy application cannot be migrated to the multi-tenant computing environment; and
    in response to determining that the legacy application satisfying the plurality of migration criteria:
        instantiating at least one virtualized computing container on a host system in a multi-tenant computing environment;
        executing an instance of the legacy application within the virtualized computing container, the legacy application being initially configured to run on premise and serve one tenant at a time, and where the virtualized computing container securely isolates the executing instance of the legacy application from other executing instances of the legacy application;
        processing, based on the executing, at least one request received from a first client by the instance of the legacy application; and
        quiescing the virtualized computing container based on at least one quiescing criterion having been satisfied by the instance of the legacy application.

2. The method of claim 1, further comprising:
    instantiating at least one additional virtualized computing container on the host system; and
    executing an additional instance of the legacy application within the additional virtualized computing container, where the virtualized computing container serves the first client and the additional virtualized computing container serves a second client.

3. The method of claim 1, further comprising:
    receiving, by a load balancer, the request from the client;
    selecting, by the load balancer, at least one request dispatcher; and
    sending the request to the at least one request dispatcher.

4. The method of claim 3, wherein instantiating the at least one virtualized computing container is based on:
    extracting, by the request dispatcher, a tenant identifier from the request, the tenant identifier uniquely identifying the first client;
    comparing, by the request dispatcher, the tenant identifier to a set of mapping information, where the set of mapping information maps each of a set of clients to at least one virtualized computing container;
    determining, by the request dispatcher and based on the comparing, that a virtualized computing container fails to be mapped to the tenant identifier; and
    dynamically performing the instantiating based on determining that a virtualized computing container fails to be mapped to the tenant identifier.

5. The method of claim 4, further comprising:
    sending, by the request dispatcher, the request to the virtualized computing container after the container has been initialized that the instance of the legacy application has been executed.

6. The method of claim 3, further comprising:
    extracting, by the request dispatcher, a tenant identifier from the request, the tenant identifier uniquely identifying the first client;
    comparing, by the request dispatcher, the tenant identifier to a set of mapping information, where the set of mapping information maps each of a set of clients to at least one virtualized computing container;
    determining, by the request dispatcher and based on the comparing, that the virtualized computing container is mapped to the tenant identifier; and
    sending, by the request dispatcher, the request to the virtualized computing container.

7. The method of claim 1, wherein the at least one quiescing criterion comprises one of:
    the instance of the legacy application performing an exit operation, the exit operation stopping executing of the instance of the legacy application; and
    the instance of the legacy application comprising an idle state.

8. The method of claim 1, wherein the instance of the legacy application writes its current state to a persistent storage prior to the virtualized computing container being quiesced.

9. The method of claim 1, further comprising:
    receiving the request from the client;
    determining, based on an identifier within the request, that the request is state-full and related to other requests;
    analyzing a set of mapping information, where the set of mapping information maps each of a set of clients to a set of virtualized computing containers and further maps each of the set of virtualized computing containers to a set of related requests;
    determining, based on the analyzing, the virtualized computing container is mapped to the request; and
    sending the request to the virtualized computing container based on determining that the virtualized computing container is mapped to the request.

* * * * *